Figure 1:
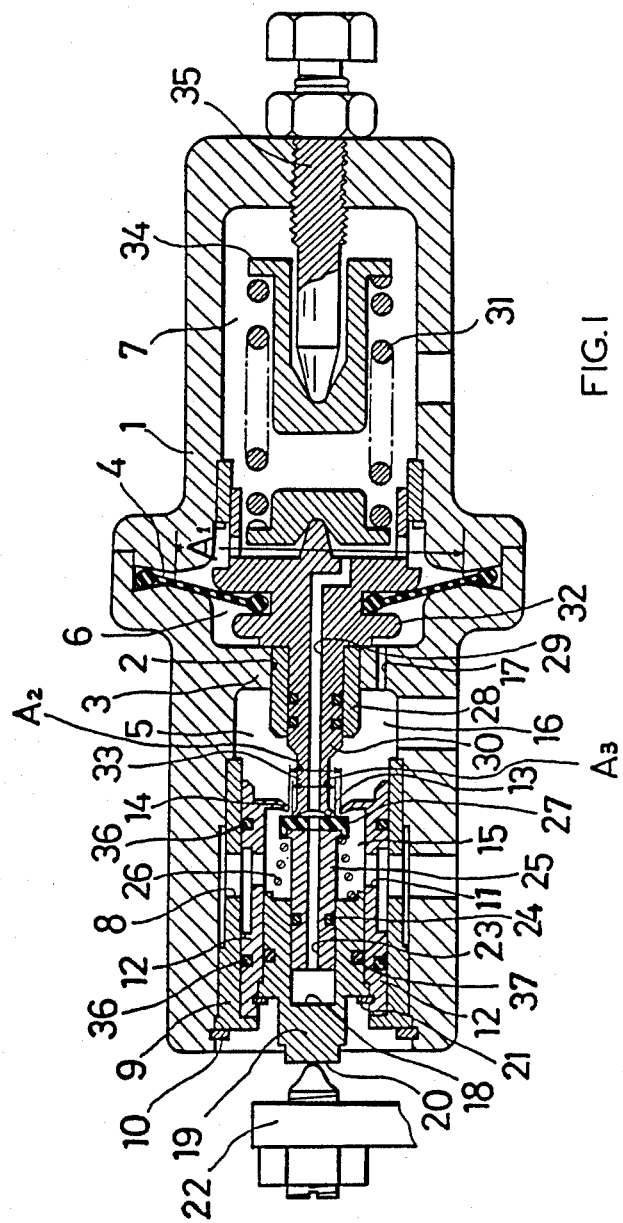

United States Patent [19]

Nakao et al.

[11] Patent Number: 4,724,859
[45] Date of Patent: Feb. 16, 1988

[54] SELF-LAPPING TYPE VALVE DEVICE

[75] Inventors: Yasuo Nakao, Kobe; Mitsuhiro Ikeda, Amagasaki, both of Japan

[73] Assignee: Nippon Air Brake Co., Ltd., Kobe, Japan

[21] Appl. No.: 939,594

[22] Filed: Dec. 9, 1986

[51] Int. Cl.⁴ ............................................. G05D 16/06
[52] U.S. Cl. .............................. 137/116.5; 137/627.5; 303/54
[58] Field of Search .......................... 137/116.5, 627.5; 303/54

[56] References Cited
U.S. PATENT DOCUMENTS

| 3,071,147 | 1/1963 | Dudzinski | 137/116.5 |
| 3,411,523 | 11/1968 | Lapera | 137/116.5 |
| 4,324,436 | 4/1982 | Reinecke | 303/54 X |

Primary Examiner—Robert G. Nilson
Attorney, Agent, or Firm—G. J. Falce

[57] ABSTRACT

A self-lapping type valve device having a construction in which the pressure force acting on the valve assembly is substantially the same when the valve assembly is in a lap condition following either a pressure-buildup phase of control or a pressure-release phase of control, thereby reducing hysteresis heretofore affecting such valve devices.

4 Claims, 5 Drawing Figures

SELF-LAPPING TYPE VALVE DEVICE

BACKGROUND OF THE INVENTION

This invention relates to self-lapping type brake valves as used in the air brake system of railroad trains.

As is known, a self-lapping type of brake valve is utilized by being installed in the air brake system of railroad trains. This controls the pressure in air pipes, such as in control units, brake cylinders, etc., being based on back-and-forth movement of the fluid pressure valve units which continuously move by rotating the self-lapping can at the set rotation angle by the rotating operation of a lever. This kind of self-lapping type brake valve is shown in the "New Electric Train Air Brake Unit Explanation", 9th edition, pp. 301–214 (Nov. 15, 1974, published by Kouyuu Co.). The conventional technique, as explained, below is based on FIG. 5.

The inside of the housing 101, having a space in it, is divided into the following:

a supply chamber 115 connected to the main air reservoir located outside of this Figure, two partition walls 103, a central opening 102 in each wall, a piston 100 having a diaphragm 104, a power chamber 116 connected to the air line, such as control units, brake cylinders, etc. which are outside of this Figure, a diaphragm chamber 106 connected to the delivery chamber 116 through a throttle valve 117 of the partition wall 103 on the side of the piston 100, and an atmospheric pressure chamber 107 opened to the outside atmosphere.

Within each opening 102 of the two partitions 103 and in the opening 141 formed in an outside wall 140 of the housing 101, a bushing 109 is attached, which forms the ports 142, 143, and 144 on the circumference. Further, inside of the bushing 109, a cylindrical supply valve seat member 112 is installed, which is provided with three O-rings 136 fixed on the circumference. Bushing 109 has a stop ring 110, against which an end cap 119 of supply valve seat member 112 is engaged. The actuator mechanism 122, which moves back-and-forth by the handle operation that is located outside of the Figure, acts on the surface 120 of end cap 119. On the circumference of the supply valve seat member 112, a port 146 is formed, which leads the pressurized air of the supply chamber 115 through the port 142 to a spring chamber 145 in the supply valve seat member 112; and further, a port 147 is formed, which connects with the supply valve seat member 112 through the delivery chamber 116 and the port 143. At the inside of the supply valve seat member 112, a supply valve seat 114 is formed; and the head 127a of the supply valve 127, fitting into the supply valve seat, is placed in a spring chamber 145 in such a way that its foot 127b protrudes from the end of member 112 opposite end cap 119. The supply valve 127 is urged in the direction that holds the supply valve against seat 114 by the supply valve spring 126, which is installed in the spring chamber 145. Further, in case the supply valve 127 comes off of its seat, a passage 148 leads pressurized air (coming from the supply chamber 115) from the spring chamber 145 to the delivery chamber 116 at the foot 127b.

Figure 5:
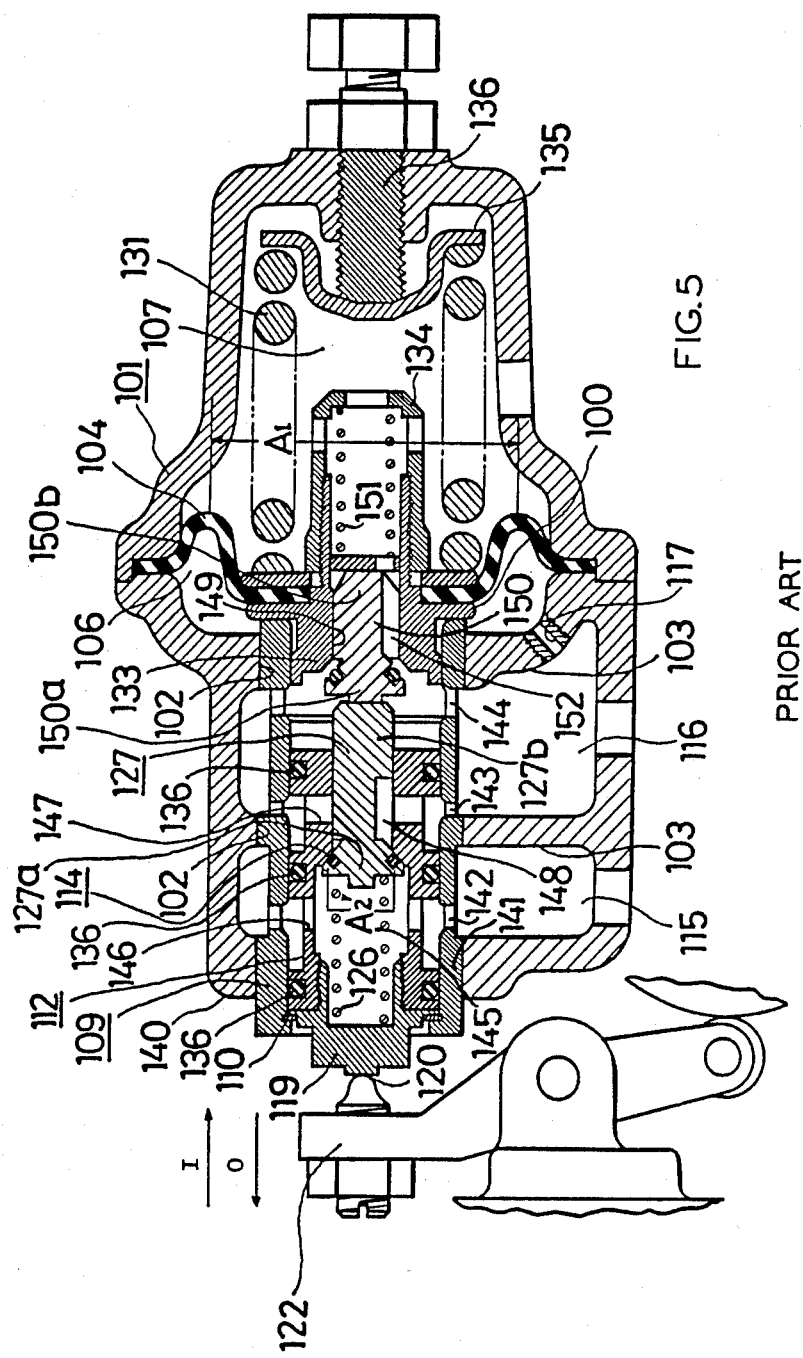

A movable exhaust valve seat 133, which protrudes into the delivery chamber 116 of the piston 100, has a stop that is engageable with bushing 109 of the side adjacent piston 100. Simultaneously, the head 150a of the exhaust valve 150, which is contained in a bore 149 beyond the exhaust valve seat 133, makes contact with the foot 127b of the supply valve 127. Then, the exhaust valve spring 151, supported by a spring seat 134 which is fixed to the piston 100, is connected to the foot 150b of the exhaust valve 150. It always pushes the exhaust valve 150 in the direction of the supply valve 127. The exhaust valve spring 151 is weaker than the supply valve spring 126 when the force of the supply valve spring 126 is conveyed to the exhaust valve 150 via the supply valve 127, due to the resilience of this supply valve spring 126. The piston 100 is always pushed toward the supply valve 127 by the adjusting spring 131, which is installed in the atmospheric pressure chamber 107. Its movement toward the supply valve 127 is limited by engagement with bushing 109. In case the exhaust valve 150 becomes disengaged from the exhaust valve seat 133, a passage 152, which communicates delivery chamber 116 and the atmospheric pressure chamber 107, is opened. In FIG. 5, a spring seat 135 receives the adjusting spring 131, and an adjusting screw 136 adjusts the degree of compression of this adjusting spring 131.

First, the operation that supplies the pneumatic pressure to the delivery chamber 116 is explained.

As the actuator mechanism 122 is operated in the direction of arrow I, the end cap 119 contacted by the actuator mechanism 122, the supply valve seat spool 112, and the supply valve 127 move in the same direction. Thus, the flow path between the delivery chamber 116 and the atmospheric pressure chamber 107 is closed, since the exhaust valve 150 connected to the foot 127b of the supply valve 127 is seated in the exhaust valve seat 133 by overcoming the force of exhaust valve spring 151.

When the actuator mechanism 122 moves in the direction of arrow I, the supply valve 127 is prevented from further moving in the arrow I direction, since the exhaust valve 150 now sits in the exhaust valve seat 133 and is pushed in the direction to the supply valve 127 by the adjusting spring 131. However, the supply valve seat member 112 continues to move, the supply valve spring 126 is compressed, and the supply valve seat 114 becomes free from the supply valve 127. As a result, the pressurized air of the supply chamber 115 is led through the spring chamber 145 to the delivery chamber 116, from where it is led to the diaphragm chamber 106 through throttle 117. The piston 100, which is holding the diaphragm 104, moves against the force of the adjusting spring 131 while the exhaust valve 150 is sitting in the exhaust valve seat 133 until balance between the pressure in the delivery chamber 116 and the resilience of the adjusting spring 131 is established. With this movement, the supply valve 127, which is pushed against the exhaust valve 150 by the supply valve spring 126, moves in the same direction as the exhaust valve 150. Thus, the distance between the supply valve 127 and the supply valve seat 114 gradually becomes shortened until in the end, the supply valve 127 returns to the supply valve seat 114. This then shuts OFF the supply of pressurized air from the supply chamber 115 to the delivery chamber 116, and results in a lap condition in the pressure-buildup phase of brake control.

Now, the releasing operation, that is, the movement that exhausts the pressurized air from the delivery chamber 116, is explained.

When the actuator mechanism 122 is operated in the opposite direction, that is, in the direction of arrow 0, spring 126 becomes caged and thus ineffective to exert resistance to movement of supply valve 127. Accordingly, spring 151 is effective to unseat exhaust valve 150, thereby allowing pressure in diaphragm chamber 106 to exhaust via throttle 117, delivery chamber 116, port 144, the exhaust valve seat 133, and atmospheric chamber 107. At the same time, supply valve 127 remains seated so that no further pressure is supplied while the delivery chamber pressure is being reduced. As the pressure in delivery chamber 116 and diphragm chamber 106 is lowered, piston 100 is moved in the direction of the arrow 0 by the force of the adjusting spring 131 along with the exhaust valve seat 133. With this, the distance between the exhaust valve 150 and the exhaust valve seat 133 becomes shortened. At last, the exhaust valve seat 133 shuts OFF the exhaust to the atmospheric pressure chamber 107 from the delivery chamber 116 by engagement with the exhaust valve 150, and results in a lap condition in the pressure-release phase of brake control.

In the foregoing, the explanation covers the situation in which the delivery chamber pressure is used for a straight air brake. When it is desired to utilize the delivery chamber pressure for controlling an automatic brake, the above-explained brake movement and brake-release movement become just opposite. Therefore, a detailed explanation is omitted here.

According to the conventional technique, the following relationship is established: the force in the lap condition during a pressure-buildup, which balances the resilience $W_1'$ of the adjusting spring 131 that acts on the piston 100 and attached diaphragm 104, is equal to the force which the pressure PA of the supply chamber 115 exerts on the supply valve 127, plus the difference of the force that the pressure PB of the delivery chamber 116 exerts on the effective area $A_1'$ of the piston 100 and the force that the pressure PB of the delivery chamber 116 exerts on the supply valve 127, namely, on the effective area $A_2'$ of the supply valve seat 114. Thus, the following equation is established:

$$(A_1' - A_2') \times PB + A_2' \times PA = W_1' \quad (a)$$

On the other hand, in the lap condition during pressure-release, the force $A_2' \times PA$ in the above equation (a), which acts on the supply valve 127 is supported by the supply valve seat 114 and is not transmitted to spring 131. Thus, the following equation is possible:

$$(A_1' - A_2) \times PB = W_1' \quad (b)$$

As is clear from equations (a) and (b), the force against $W_1'$ during pressure-buildup lap time is different from the force during pressure-release lap time. This is hysteresis, that is, the pressure PB of the delivery chamber 116 is different when applying the brake and when releasing the brake, even though the setting of actuator mechanism 122 is the same. Thus, the fact that the control effect of the railroad train differs, becomes a problem.

The cause of this problem is that the force $A_2' \times PA$ in the above equation (a) exists.

SUMMARY OF THE INVENTION

Therefore, the object of this invention is to solve this problem by making the force which pushes the supply valve 127 toward the adjusting spring 131 as small as possible, in order for the forces against the resilience of the adjusting spring 131 in the case of a lap condition during a pressure-buildup and in the case of a lap condition during a pressure-release being substantially equal.

According to the present invention, this object is achieved by providing:

a body having a partition wall forming, in conjunction with said body, a first cavity on one side of said partition and a second cavity on the other side of said partition, said partition having an opening therethrough communicating said first and second cavities;

a cylindrical member operably-disposed in said body within said first cavity for axial movement therein, said cylindrical member having an inturned flange comprising an annular supply valve seat, on one side of which is formed a first fluid pressure chamber and on the other side of which is formed a second fluid pressure chamber;

an axial bore in said cylindrical member opening into said first fluid pressure chamber;

a valve element carried in said bore so as to be movable relative to said annular supply valve seat;

means for connecting said bore to atmosphere;

spring means for urging said valve element toward engagement with said supply valve seat to interrupt fluid pressure communication between said first and second chambers;

a piston abutment operatively-disposed in said body within said second cavity for axial movement therein, said piston abutment defining on one side thereof, adjacent said partition wall, a third fluid pressure chamber and, on the other side thereof, an atmospheric chamber;

throttle means in said partition wall for establishing fluid pressure communication between said second and third chambers;

a stem of said piston abutment projecting from said one side of said piston abutment through said opening in said partition wall, said stem having formed at the end thereof an annular exhaust valve seat, the diameter of which is substantially the same as the diameter of said bore, and only sufficiently less than the diameter of said supply valve seat as to fit within the annulus thereof;

a passageway in said piston abutment communicating the annulus of said exhaust valve seat with said atmospheric chamber; and an adjusting spring acting on said piston abutment in a direction urging said exhaust valve seat toward engagement with said valve element.

In the case of utilization as a straight air brake, when the pressure unit pushes the end cap in the direction towards the partition wall, the supply valve seat cylinder and the supply valve seat move also in that direction. Then the supply valve comes to sit in the exhaust valve seat of the exhaust valve tip and shuts OFF the connection between the atmospheric pressure chamber and the power chamber. Further, when the pressure unit continues to push, the supply valve seated in the exhaust valve seat cannot move, being the piston is not moving because of the strong force of the adjusting spring. Thus, the supply valve seat is disengaged from the supply valve. Because of this, the pressurized air of the supply chamber flows into the delivery chamber, and further, flows into the diaphragm chamber via the throttle. The pneumatic pressure acting on the piston compresses the adjusting spring to increase its force. The piston and the diaphragm, as they maintain the supply valve engaged with the exhaust valve seat by the action of the supply valve spring, move in relation to the compression of the adjusting spring until the adjusting spring force is in balance. Thus, the distance between the supply valve seat and the supply valve becomes smaller and smaller and, at last, the supply valve becomes seated on the supply valve seat, shutting OFF the supply of pressurized air from the supply chamber to the delivery chamber. In this way, the lap state during pressure-buildup, occurs.

As the actuator mechanism separates from the end cap at the time of brake-release, the supply valve seat moves in the same direction, holding the supply valve seated. With this, the pressurized air of the power chamber is exhausted to the atmospheric pressure chamber via the exhaust vent, since the supply valve becomes disengaged from the exhaust valve seat. The pressure in the delivery chamber and in the diaphragm chamber decreases, and the diaphragm and the piston are moved in the direction towards the supply valve by the force of the adjusting spring. The distance between the supply valve and the exhaust valve seat gradually is shortened until the supply valve engages the exhaust valve seat and shuts OFF the exhaust of the pressurized air to the atmospheric pressure chamber from the delivery chamber. This makes the lap state during pressure-release possible.

In the above-described cases of both the pressure-buildup lap state and the pressure-release lap state, the space behind the supply valve connectes to the atmospheric pressure chamber through the vent in the supply valve and the exhaust vent in the exhaust valve.

Therefore, when the effective area of the piston is $A_1'$, the effective area of the supply valve seat is $A_2$, the effective area of the exhaust valve seat of the exhaust valve tip is $A_3$, the force of the adjusting spring is $W_1$, the force of the supply valve spring is $W_2$, the supply chamber pressure is PA, and the delivery chamber pressure is PB, the following equation becomes possible at the pressure-buildup lap state:

$$(A_1-A_3)\times PB+(A_2-A_3)\times(PA-PB)+W_2=W_1$$

and at the pressure-release lap state:

$$(A_1-A_3)\times PB=W_1$$

That is, the force understood in the conventional technique as the cause of the hysteresis occurs from the different states between the pressure-buildup lap and the pressure-release lap and is $(A_2-A_3)\times(PA-PB)+W_2$. In this expression, $(A_2-A_3)\times(PA-PB)$ becomes very small, since the radii of the supply valve seat and the exhaust valve seat are very similar. As the result, $(A_2-A_3)\times(PA-PB)$ becomes a very small value. $W_2$ is also a very small value, since the force of the supply valve spring, which has almost equal force to the compression resistance, moves by overcoming this compression resistance in the space of the compressed part of the supply valve.

Thus, when it is compared to the force which acts on the supply valve in the above-mentioned conventional technique, that is, $A_2'\times PA'$, it becomes $A_2'\times PA'(A_2-A_3)\times(PA-PB)+W_2$. In this way, the force relative to the adjusting spring in both the pressure-buildup lap state and the pressure-release lap state is almost equal and hysteresis is almost non-existent.

This object and other objects and advantages of the invention will become apparent from the following explanation, when taken with the accompanying drawings, in which:

FIGS. 1 through 4 show a cross-sectional view of the self-lapping type valve device, according to the present invention, in its different positions; and FIG. 5 shows a conventional type of self-lapping valve device.

DESCRIPTION AND OPERATION

The space in the housing 1 is divided into three, that is, the interior chamber 5, the diaphragm chamber 6, and the atmospheric pressure chamber 7 by the partition wall 3 with a vent in its center, and the piston 32 with the diaphragm 4. The edge on the other side of this partition wall 3 of the interior chamber 5 is open. Inside of this, the cylindrical bushing 9, forming a port 8 on the circumference, has a stop 10. Further, inside of the bushing 9, the supply valve seat cylinder 12, forming a port 11 on the circumference, is fixed in a freely-compressed condition so that it does not protrude from the open edge of the interior chamber 5. At the same time, an annular inturned supply valve seat 14 protrudes in the direction of the inner circumference at the inside edge of the supply valve seat cylinder 12, so as to form an opening 13. This supply valve seat 14 divides the interior chamber 5 into the supply chamber 15 to which a source of pneumatic pressure, such as pressure from the main reservoir, is connected, and into the delivery chamber 16 to which the brake units or the brake pipes are connected. At the same time, this delivery chamber 16 is connected to the diaphragm chamber 6 by a throttle 17 installed in the partition wall 3. Inside the open edge of the interior chamber 5, the end cap 19, which has an opening in the direction towards the other side, is fastened by a stop 21 to the supply valve seat cylinder 12 and exposes its surface 20 to the outside of the housing 1. Actuator mechanism 22 acts against this surface 20. Further, inside the space 18 of this end cap 19, the compresion unit 25, containing a central passage 23 and carrying an O-ring to decrease the compression resistance, is fixed in the longitudinal direction of the housing 1 in a freely-compressed condition. This compression unit 25 is part of the supply valve 27, and is pushed in the direction of the supply valve seat 14 by the supply valve spring 26.

The bushing 28 is fastened in the vent 2 of the partition wall 3. At the same time, the exhaust valve 30, having a central exhaust passage 29, extends between the delivery chamber 16 and the atmospheric pressure chamber 7, being free to move inside this bushing. The exhaust valve 30 moves together with the piston 32 as one entity, since the piston 32 has this outlet valve 20 formed on the side of the atmospheric pressure chamber 7 close to the partition wall 3. This piston 32 is always pushed towards the delivery chamber 16 by the adjusting spring 31 installed in the atmospheric pressure chamber 7, but its transposition is interrupted by contact with the partition wall 3. At the tip of this exhaust valve 30, protruding on the side of the delivery chamber 16, is formed the exhaust valve seat 33, which is free to move through the opening part 13 in the center of the supply valve seat 14, so as to engage and disengage supply valve 27.

In the above-described arrangement, the effective area $A_2$ of the supply valve seat 14 is made slightly larger than the effective area $A_3$ of the exhaust valve seat 33. The effective area of the space 18, in which the compressing unit 25 of the supply valve 27 is inserted, is substantially the same size as that of the effective area $A_3$ of the exhaust valve seat 33.

34 is the receptacle of the adjusting spring 31, and 35 is the adjusting bolt which adjusts the resiliency of the adjusting spring 31 installed in the housing 1, and 36 is the O-ring installed on the circumference of the supply valve seat cylinder 12, and 37 is the O-ring installed on the circumference of the connector 19.

The following explanation deals with the case when the above-described arrangement is used for the straight air brake, by connecting the brake units to the delivery chamber 16.

First, the movement at the time of braking, namely, when pressurized air is supplied to the delivery chamber 16, is explained.

Figure 2:
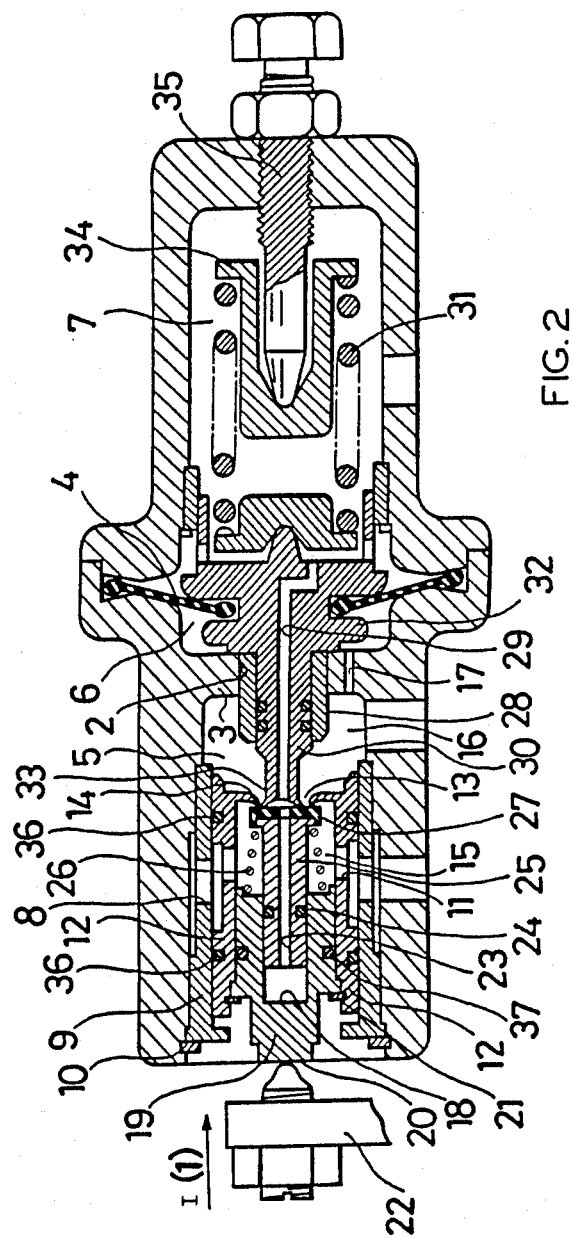

When the actuator mechanism 22 moves from the state shown in FIG. 1 to the arrow I (1) direction of the FIG. 2 state, the connector 19, which is touched by the pressure unit, and the supply valve seat cylinder 12 move in the same direction. Thus, the supply valve 27, being in engagement with the exhaust valve seat 33, closes the exhaust vent 29 and thus shuts OFF the atmospheric pressure chamber 7 and the delivery chamber 16.

Figure 3:
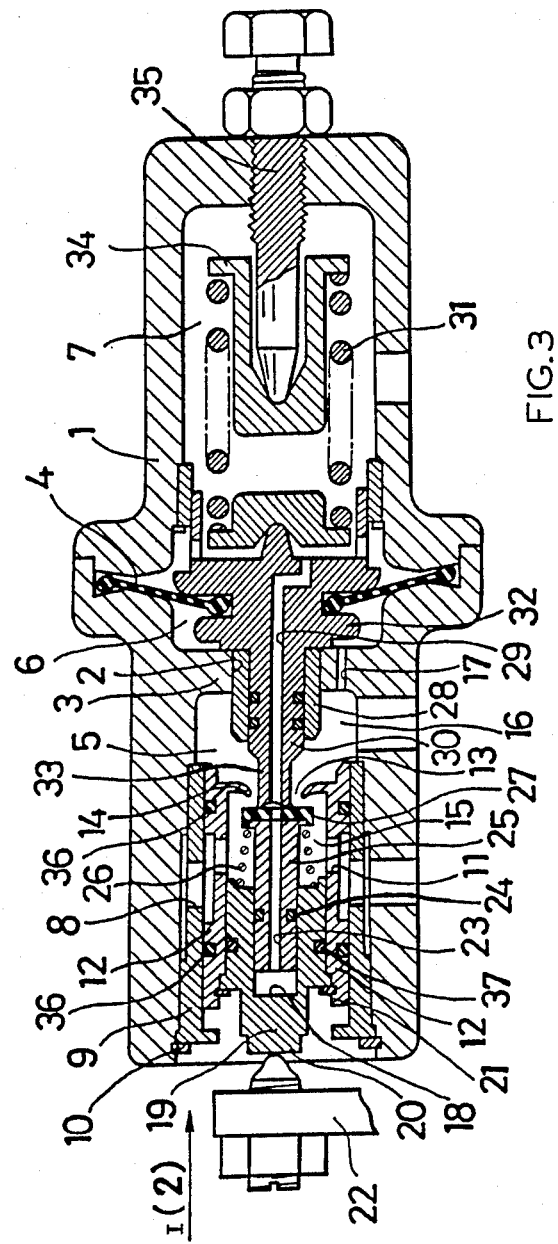

Further, as the actuator mechanism 22 moves from the state of FIG. 2 to the arrow I (2) direction of FIG. 3, the end cap 19, contacted by the actuator mechanism 22 and the supply valve seat cylinder 12, also moves in the same direction. However, the piston 32 is stopped by the strong resilience of the adjusting spring 31. Thus, the supply valve 27, which is in engagement with the exhaust valve seat 33 on the tip of this piston 32, cannot move. Because of this, the compressing part 25 of the supply valve 27 deflects the supply valve spring 26 by compressing the space 18, and the supply valve seat 14 becomes disengaged from the supply valve 27. This allows the pressurized air of the supply chamber 15 to flow to the delivery chamber 16 through this opening. Further, this pressurized air flows into the diaphragm chamber 6 from the delivery chamber 16 through the throttle 17 and moves the piston 32 in opposition to the resilience of the adjusting spring 31. As the piston 32 and the diaphragm 4 move in relation to the resilience of the adjusting spring 31, the supply valve 27 remains in engagement with the exhaust valve seat 33 by the action of the supply valve spring 26, as the pressure of the delivery chamber 16 and the resilience of the adjusting spring 31 come into balance. As this occurs, the distance between the supply valve seat 14 and the supply valve 27 gradually decreases until the supply valve 27 engages in the supply valve seat 14, so that any further supply of pressurized air to the delivery chamber 16 is cut OFF and the lap state during a pressure-buildup is accomplished, as seen in FIG. 4.

Next, the operation to release the pressurized air from the delivery chamber 16 is explained.

Figure 4:
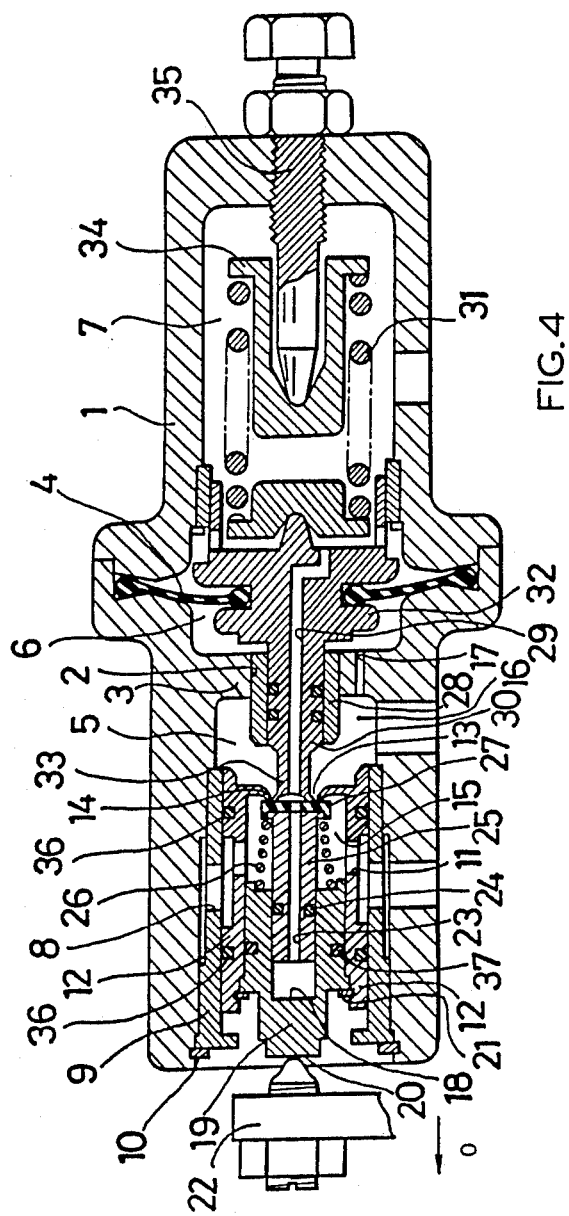

When the actuator mechanism 22 is operated in the opposite direction to that in the pressure-buildup state, that is, in the direction of arrow 0 in FIG. 4, the supply valve seat 14 moves in the same direction under the influence of the pressurized air in delivery chamber 16, thus keeping the supply valve 27 seated. Because of this, the supply valve 27 leaves the exhaust valve seat 33 of the exhaust valve 30. Thus, the pressurized air in the power chamber 16 is exhausted to the atmospheric pressure chamber 7 through the exhaust vent 29, and the pressure in the delivery chamber 16 decreases. With the decreasing pressure in the delivery chamber 16, the pressure in the diaphragm chamber 6 also decreases and, as the result, the diaphragm 4 and the piston 32 move in the direction towards the supply valve 27 by the resilience of the adjusting spring 31. Thus, the distance between the supply valve 27 and the exhaust valve seat 33 gradually becomes shortened until the supply valve seat 33 is in contact with the supply valve 27, and duly, the exhaust of the pressurized air to the atmospheric pressure chamber 7 from the delivery chamber 16 is shut OFF. This is the lap condition during pressure-release.

Further, it is possible to use this invention by connecting the delivery chamber 16 to the brake pipes in the same way as in the conventional case. In this case, the brake movement and the release movement in the above-described arrangement become opposite. Therefore, the explanation of this is omitted here.

In accordance with the foregoing solution for decreasing the hysteresis problem, the following is considered:

In FIG. 5 of the conventional valve, first, by minimizing the effective area of the supply valve seat as much as possible, the force which the pressurized air in the supply chamber exerts on the effective area of the supply valve seat, namely, the force which becomes the cause of the hysteresis, is minimized. However, such a composition does not enable obtaining a sufficient flow capacity for the supply of pressurized air to the delivery chamber from the supply chamber. Thus, this is a defect. In the second method, if the air pressure in the supply chamber is decreased to the minimum pressure which is necessary for the air pressure in the delivery chamber, the force which acts on the effective area of the supply valve seat becomes minimized. However, in this case, an additional pressure-adjusting valve would be required in the pressure supply path to the supply chamber from the main air reservoir, which is the air source. At the same time, the difference in air pressure between the delivery chamber and the supply chamber becomes small when the air pressure in the delivery chamber approaches the maximum value and, as a result, the speed of the pressurized air supply from the supply chamber to the delivery chamber decreases and, therefore, the brake operation becomes slowed down. This is another defect.

However, in the present invention, the area of the opening in the supply valve seat can be large, and the size of the exhaust valve seat can have the same effective maximum value area which enables air flow through this opening. Therefore, the pressurized air supplied to the delivery chamber from the supply chamber is fully utilized, and the slow-down of the brake movement by low pressure is prevented. Simultaneously, it minimizes the hysteresis which comes from the difference of the effective areas of the supply valve seat and the exhaust valve seat.

We claim:
1. A self-lapping type valve device comprising:
  (a) a body having a partition wall forming, in conjunction with said body, a first cavity on one side of said partition and a second cavity on the other side of said partition, said partition having an opening therethrough communicating said first and second cavities;
  (b) a cylindrical member operably-disposed in said body within said first cavity for axial movement therein, said cylindrical member having an inturned flange comprising an annular supply valve seat, on one side of which is formed a first fluid pressure chamber and on the other side of which is formed a second fluid pressure chamber;

(c) an axial bore in said cylindrical member opening into said first fluid pressure chamber;

(d) a valve element carried in said bore so as to be movable relative to said annular supply valve seat;

(e) means for connecting said bore to atmosphere;

(f) spring means for urging said valve element toward engagement with said supply valve seat to interrupt fluid pressure communication between said first and second chambers;

(g) a piston abutment operatively-disposed in said body within said second cavity for axial movement therein, said piston abutment defining on one side thereof, adjacent said partition wall, a third fluid pressure chamber and, on the other side thereof, an atmospheric chamber;

(h) throttle means in said partition wall for establishing fluid pressure communication between said second and third chambers;

(i) a stem of said piston abutment projecting from said one side of said piston abutment through said opening in said partition wall, said stem having formed at the end thereof an annular exhaust valve seat, the diameter of which is substantially the same as the diameter of said bore, and only sufficiently less than the diameter of said supply valve seat as to fit within the annulus thereof;

(j) a passageway in said piston abutment communicating the annulus of said exhaust valve seat with said atmospheric chamber; and (k) an adjusting spring acting on said piston abutment in a direction urging said exhaust valve seat toward engagement with said valve element.

2. A self-lapping valve device, as recited in claim 1, wherein said means for connecting said bore to atmosphere comprises a through passageway in said valve element opening at one end within said bore, and at the other end adjacent said exhaust valve seat in substantially coaxial alignment with said passageway in said piston abutment.

3. A self-lapping valve device, as recited in claim 1, wherein the strength of said spring means is less than the strength of said adjusting spring.

4. A self-lapping valve device, as recited in claim 1, wherein said partition wall provides a stop against which said piston abutment is forced by said adjusting spring in the absence of fluid pressure in said third chamber.

* * * * *